Nov. 15, 1966     D. W. PESSEN     3,285,060
PENDULUM IMPACT TESTER
Filed Dec. 3, 1963     2 Sheets-Sheet 1
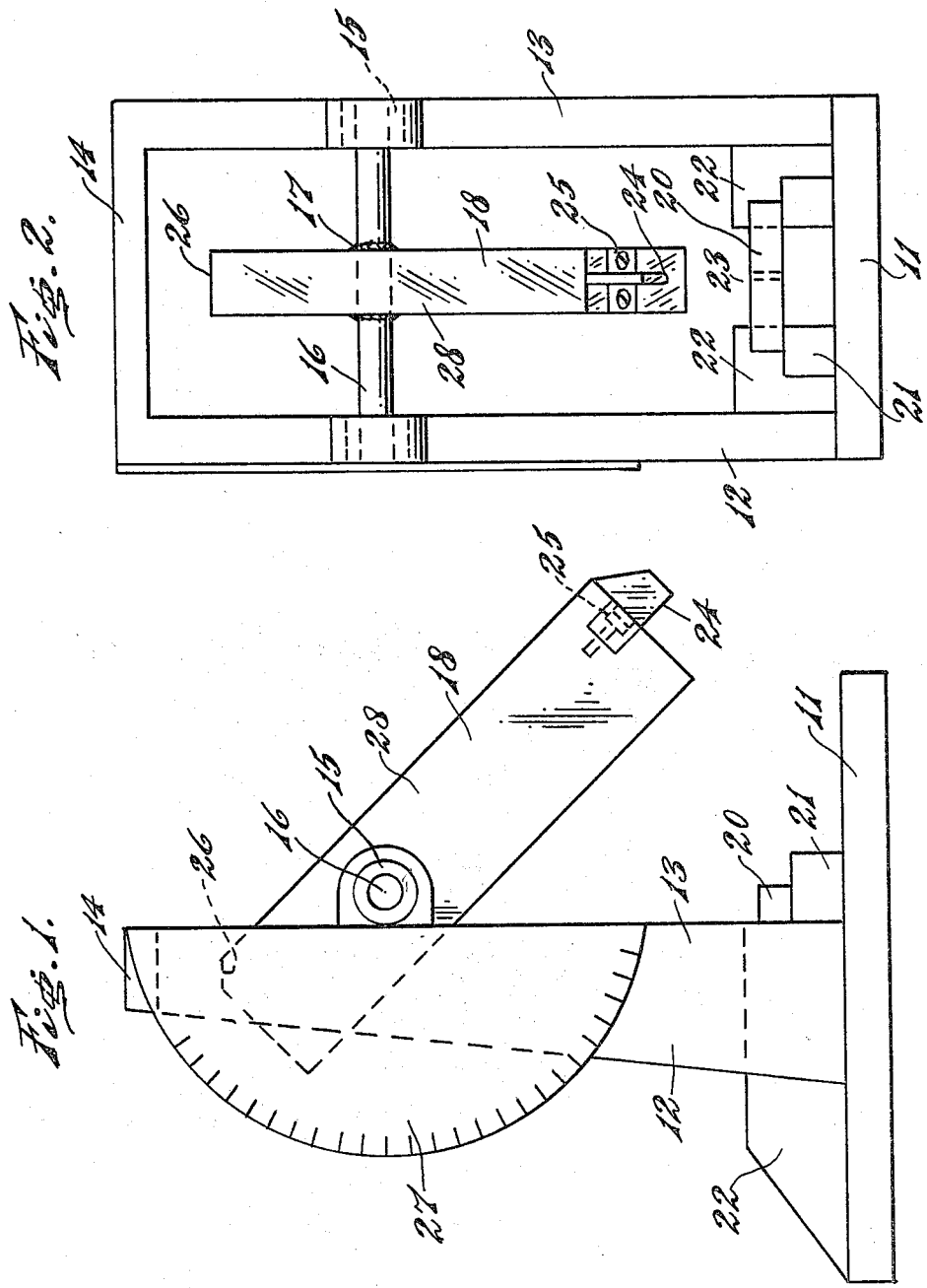
INVENTOR
David W. Pessen
BY
ATTORNEYS

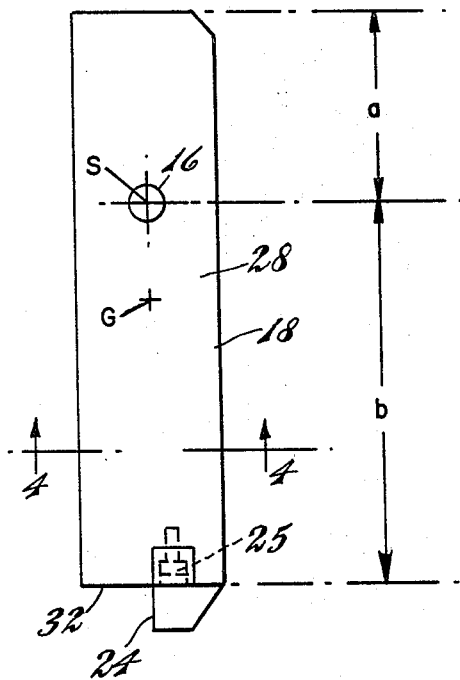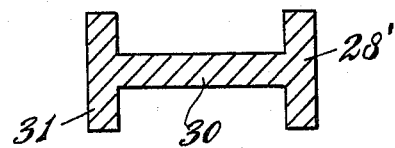

United States Patent Office 3,285,060
Patented Nov. 15, 1966

3,285,060
PENDULUM IMPACT TESTER
David W. Pessen, Philadelphia, Pa., assignor, by mesne assignments, to The Warner & Swasey Company, Cleveland, Ohio, a corporation of Ohio
Filed Dec. 3, 1963, Ser. No. 327,771
5 Claims. (Cl. 73—101)

The present invention relates to testing machines of the impact type, wherein the specimen is fractured by striking it with a swinging pendulum hammer, and also to improvements in the pendulum construction.

A purpose of the invention is to produce a pendulum for an impact testing machine in which no portion of the pendulum is located below the striking edge, so that the problem of interference is greatly reduced or even totally eliminated.

A further purpose is to devise a pendulum which does not greatly extend beyond the striking edge in the horizontal direction when the pendulum is hanging freely.

A further purpose is to produce a pendulum of greater strength and rigidity which is less susceptible to being damaged by deformation or fracture.

A further purpose is to produce a pendulum which has no weak joints and has an extremely rigid stem, so that deformation energy absorbed by the pendulum is kept at a low level.

A further purpose is to produce a pendulum which is extremely simple in design, and easy and inexpensive to manufacture accurately.

A further purpose is to produce a pendulum which allows for flexibility in design, so that the thickness of the pendulum stem is not automatically fixed but can be selected by the designer in order to satisfy necessary requirements of rigidity.

Further purposes appear in the specification and in the claims.

In the drawings I have chosen to illustrate one only of the numerous embodiments in which the invention may appear, selecting the form shown from the standpoints of convenience in illustration, satisfactory operation, and clear demonstration of the principles involved.

FIGURE 1 is a side elevation of an impact tester according to the present invention.

FIGURE 2 is a front elevation of the impact tester shown in FIGURE 1.

FIGURE 3 is a side elevation of the improved pendulum, the view containing dimensions and also indication of points useful in explaining the mathematical principle of the invention.

FIGURE 4 is a section on the line 4—4 of FIGURE 3, showing a preferred cross-section of the improved pendulum.

FIGURE 5 is a section on the line 4—4 of FIGURE 3 showing a variation, with a different very desirable cross section for the improved pendulum.

In impact testing machines of the type in which a specimen is fractured by striking it with a swinging pendulum hammer, the pendulum hammer is released from a predetermined height, hits and fractures the specimen, and then rises again before it finally comes to a stop and begins to fall back. The difference between the pendulum height at the moment of release and the maximum height attained after fracturing the specimen is a measure of the impact energy absorbed by the specimen.

Impact testing machines in common use are frequently of the Charpy type, the Izod type, or the tension type. These various types of impact testing machines differ from one another primarily in the shape of the specimen, in the way in which the specimen is held at the moment of fracture, and in the shape of the hammer striking edge. The principle of operation of these machines is the same, and substantially as set forth above.

One important requirement in pendulum-type impact testing machines is that the center of percussion of the pendulum be located at the center of the striking edge of the pendulum hammer which strikes and fractures the specimen. This requirement must be met in order to substantially eliminate shock at the supporting bearings for the pendulum. Otherwise the following difficulties would occur:

(1) Shock would be transmitted back to the supporting frame, and this would cause erroneous readings of the impact value.

(2) The pendulum would be more susceptible to damage by bending or by fracture.

(3) The pendulum would absorb more deformation energy causing erroneous impact readings.

(4) The bearings would deteriorate rapidly.

This requirement must also be satisfied in order to meet the standard specifications of the American Society for Testing Materials for pendulum-type impact testing machines (ASTM Specification E–23). In prior art pendulum-type impact testing machines, the above requirement relating to the center of percussion has usually been met by constructing the pendulum in the shape of a long thin stem, at the lower end of which a heavy head is attached, the head containing the striking edge. Most of the mass of the pendulum is thus concentrated in the head. One serious disadvantage in such a pendulum is that a considerable portion of the pendulum head must be located below the striking edge in order to place the center of percussion of the pendulum exactly at the center of the striking edge. This often produces serious problems of interference, since the two parts of the broken specimen, being projected out after the moment of impact, may hit the lower part of the head, thus changing the energy relations and producing an erroneous test result. A further drawback of a pendulum of the above construction is that there must be a joint between the stem and the head. This joint is inherently an element of weakness, since the stem of necessity is very slender in order that its weight may be reduced to a minimum. The weakness of the joint and the slenderness of the stem result in considerable elastic deformation of the pendulum when the specimen is struck and the resulting deformation energy absorbed by the pendulum further contributes to erroneous test results.

A further drawback of a pendulum of the prior art construction is that it is relatively costly to manufacture, since the stem and the head must be very accurately machined and assembled in order to meet other functional requirements relating to weight, center of percussion, and geometric alignment.

Considering now the drawings in detail, and describing in illustration but not in limitation:

FIGURES 1 and 2 show one embodiment of the impact tester of the invention comprising a base 11 and a supporting frame 12 mounted thereon, and suitably including spaced uprights 13 and a cross-connection 14 at the top.

The frame 12 also includes bearings 15 which support a pivot shaft 16. The shaft 16 is rigidly connected as by welding or brazing at 17 to a pendulum 18. Other suitable fastening means to secure the shaft on the pendulum may be used if desired.

The test specimen 20 is supported on spaced supports 21 and is placed against anvil portions 22 which are spaced at 23 to allow the pendulum to continue its swing after it strikes the specimen.

The pendulum 18 is provided with a striking edge 24 at the bottom. The striking edge is rigidly fastened to the pendulum by means of set screws 25, but is mounted preferably in such a way as to facilitate removal and replacement if necessary. The upper righthand corner 26 of the pendulum is slightly bevelled as shown, removing sufficient weight to balance the added weight of the striking edge 24. Thus, the striking edge 24 will be vertical and will barely contact the specimen 20 when the pendulum 18 is hanging freely. The frame 12 also is provided with a scale 27 suitably engraved so that the maximum angle or height of the pendulum attained after fracturing the specimen can readily be read.

For the sake of convenience in operation, the impact testing machine may also include a release mechanism for releasing the pendulum accurately from a predetermined height, and also in some cases a pointer which automatically indicates the highest point of the scale reached by the pendulum. These refinements have no relation to the features of the present invention and are not shown.

In prior art impact testing machines, the pendulum stem was very thin or slender, so as to reduce its weight as much as possible, and the pendulum stem did not extend above the pivot shaft 16 to any considerable extent. In the device of the present invention, on the other hand, the pendulum stem is preferably constructed of one solid slab of metal having a very heavy cross-section, so that the stem is very rigid. In one preferred section shown in FIGURE 4, the stem 28 is rectangular in cross-section, so that the pendulum is very easy to manufacture. The major cross sectional dimension is transverse to the pivot axes.

FIGURE 5 shows another very desirable pendulum construction having an I-shaped stem 28′, provided with a web 30 and flanges 31 at the opposite sides. This construction also is especially rigid. Various other sections for the stem may be used as desired.

The form of FIGURE 4 is preferred where economy and simplicity of manufacture is important and otherwise the form of FIGURE 5 is preferable.

The pendulum of the invention contains no heavy lower end or hammer as such. Instead, the striking edge 24 is directly attached to the lower edge 32 of the pendulum 18. The stem 28 is extended above the axis of the pivot shaft 16 by a distance indicated as $a$ in FIGURE 3, sufficient to bring the center of percussion of the pendulum down to the center of the striking edge 24 without the necessity of having any material whatsoever extending below the striking edge. In this way, the danger of interference is minimized.

Referring to FIGURE 3, a point G denotes the center of gravity of the pendulum and a point S indicates the axis of the supporting shaft 16. If the center of percussion of the pendulum is designated P, then its location will be found from the following formula which is derived in most text books on mechanics:

$$\overline{SP} = I_0 / (m)(\overline{SG}) \qquad (1)$$

where $I_0$ is the moment of inertia of the pendulum about its pivot S and $m$ is the mass of the pendulum, neglecting the small mass of the striking edge 24. The mass of the pendulum is then given by the following equation:

$$m = (a+b)w \qquad (2)$$

where $w$ is the mass per unit length of the stem, $a$ is the vertical distance from the pivot axis S to the top of the pendulum and $b$ is the vertical distance from the pivot axis to the lower edge 32 of the pendulum excluding the striking edge.

The moment of inertia $I_0$ is found by the following integration:

$$I_0 = \int_{-a}^{b} r^2 dm = w \int_{-a}^{b} r^2 dr = \left| \frac{w}{3} r^3 \right|_{-a}^{b} = \frac{w}{3}(a^3+b^3) \qquad (3)$$

where $r$ is the distance of any given element of mass $dm$ from the shaft pivot axis S. The center of gravity G is found as follows:

$$\overline{SG} = (a+b)/2 - a = (b-a)/2 \qquad (4)$$

substituting from Equations 3, 2 and 4 into Equation 1 we obtain $$\overline{SP} = \frac{(w)(a^3+b^3)(2)}{(3)(a+b)(w)(b-a)} = \frac{2(a^2-ab+b^2)}{3(b-a)} \qquad (5)$$

In order to move the center of percussion P down to the lower edge 32 of the pendulum, the following relation must be satisfied:

$$\overline{SP} = b \qquad (6)$$

Substituting from Equation 6 into Equation 5 we obtain $$3b(b-a) = 2(a^2-ab+b^2) \qquad (7)$$

or $$2a^2 + ab - b^2 = 0 \qquad (8)$$

which has the solution $$a = b/2 \qquad (9)$$

From the above calculation it is apparent that if the pendulum stem is extended above its point of support by an amount $a$ equal to one-half of the stem length suspended below the point of support, or $b/2$, then the center of percussion will be located exactly at the lower edge 32 of the stem. If $a$ is made slightly less than $b/2$, then the center of percussion will be located slightly above the lower edge of the stem. Since the center of percussion should be located at the center of the striking edge 24, rather than at the lower edge 32 of the stem, the dimension $a$ will preferably be made slightly greater than $b/2$. However, since the length of the striking edge is small as compared to the total length of the pendulum, this difference can in most cases be neglected, so that dimension $a$ can be made substantially equal to $b/2$.

Having in mind the discussion above, the advantages of the device of the invention will be better understood. Since none of the pendulum extends below the striking edge, the problem of interference is minimized and erroneous readings from this source can be largely avoided. Since the stem of the pendulum is made of a heavy section and contains no weak joints, the stem is extremely rigid, so that the deformation energy absorbed by the pendulum is kept low. Since the stem of the pendulum preferably consists of one solid slab, its dimensions, mass distribution, and geometric alignment can be controlled accurately and at very low cost.

For ease of manufacture, the stem of the pendulum is preferably made of a slab of metal having a constant cross-section. However, it will be evident that the stem of the pendulum can, if desired, be constructed with a varying cross-section. In such a case, the derivation shown in Equations 1 to 9 does not apply and the length of the stem extending above the pivot axis S must be calculated for each individual case, depending upon the way the cross-section varies.

In view of my invention and disclosure variations and modifications to meet individual whim or particular need will doubtless become evident to others skilled in the art to obtain all or part of the benefits of my invention without copying the structure shown, and I therefore claim all such insofar as they fall within the reasonable spirit and scope of my claims.

Having thus described my invention what I claim as new and desire to secure by Letters Patent is:

1. An impact testing machine comprising in combination, supporting structure, means adapted to support a specimen which means is rigidly attached to said supporting structure, a pendulum comprising a solid stem having a striking edge rigidly attached to the lower end of said stem, the mass of said striking edge being relatively negligible with respect to the mass of the pendulum and substantially remote from the center of mass of the pendulum, a pivotal mounting for said pendulum on said supporting structure having a pivot axis for bringing said striking edge into impact contact with said specimen, said solid stem being extended above the pivot axis by an amount sufficient to make the center of percussion of said pendulum fall approximately at the center of the striking edge.

2. An impact testing machine comprising in combination, supporting structure, means adapted to support a specimen which means is rigidly attached to said supporting structure, a pendulum comprising a stem of substantially constant cross-section having a striking edge rigidly attached to the lower end of said stem, the mass of said striking edge being relatively negligible with respect to the mass of the pendulum and substantially remote from the center of mass of the pendulum, a pivotal mounting for said pendulum on said supporting structure having a pivot axis for bringing said striking edge into impact contact with said specimen, said stem extending above the pivot axis by an amount equal to approximately ½ that length of the pendulum suspended below the pivot axis.

3. An impact testing machine of claim 2, in which the stem is solid.

4. An impact testing machine of claim 2, in which said stem is of substantially rectangular cross-section.

5. An impact testing machine of claim 2, in which said stem is of I-shaped cross-section.

References Cited by the Examiner

UNITED STATES PATENTS

| | | | |
|---|---|---|---|
| 2,359,044 | 9/1944 | MacBride | 73—101 |
| 2,491,512 | 12/1949 | Moore | 73—101 X |
| 3,157,046 | 11/1964 | Orner | 73—101 |

OTHER REFERENCES

Becker: Introduction to Theoretical Mechanics, McGraw-Hill, New York, 1954, pp. 212–213.

RICHARD C. QUEISSER, *Primary Examiner*.

G. M. GRON, *Assistant Examiner*.